(No Model.)

A. G. WILKINS.
IMPLEMENT FOR PUTTING BUTTONS ON SHOES.

No. 252,563.        Patented Jan. 17, 1882.

Witnesses;
F. Walter Fowler,
H. B. Applewhaite.

Inventor;
Alexander G. Wilkins
per Atty
A. H. Evans & Co.

UNITED STATES PATENT OFFICE.

ALEXANDER G. WILKINS, OF COOPERSTOWN, PENNSYLVANIA.

IMPLEMENT FOR PUTTING BUTTONS ON SHOES.

SPECIFICATION forming part of Letters Patent No. 252,563, dated January 17, 1882.

Application filed July 22, 1881. (No model.)

*To all whom it may concern:*

Be it known that I, ALEXANDER G. WILKINS, of Cooperstown, in the county of Venango and State of Pennsylvania, have invented a new and Improved Combination Implement, to be used in attaching buttons to shoes; and I hereby declare the following to be a full, clear, and exact description thereof, reference being had to the accompanying drawings, making a part of this specification, in which—

Figure 1:
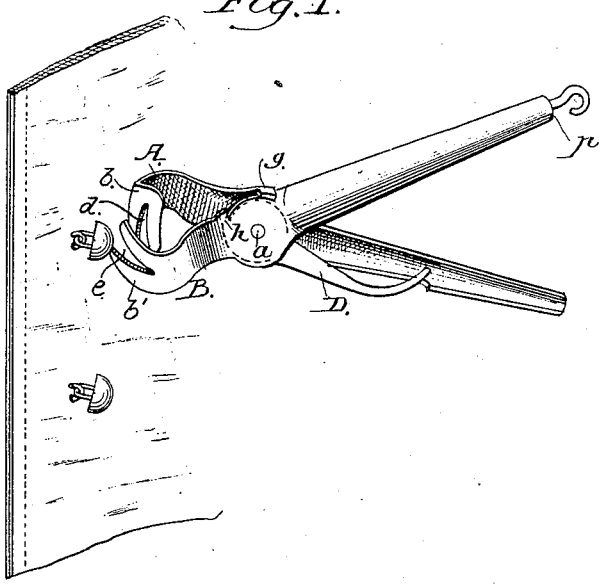
Figure 2:
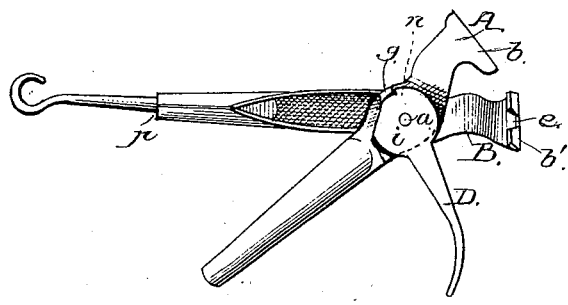

Figure 1 is a perspective view of the implement embodying my invention. Fig. 2 is a plan view, showing the button-hook extended and partially in section, the awl or piercing device being in a position to be used.

My invention relates to combination-tools for securing buttons upon shoes, and is an improvement on Letters Patent No. 235,974, granted me on December 28, 1880.

My invention consists in the construction and arrangements of certain elements in one tool whereby buttons can be expeditiously put upon shoes after the manner described in my before-mentioned Patent No. 235,974, December 28, 1880.

In order that those skilled in the art may make and use my invention, I will proceed to describe the manner in which I have carried it out.

In the said drawings are two jaws, A and B, pivoted at $a$ and provided with faces $b$ $b'$, bent at right angles to the handle portions and having cut in them bifurcations $d$ $e$ in lines at right angles to each other. This construction leaves the button-shank tightly clamped between the jaws when they are closed. The movement of the jaws is limited by means of stops $g$ $h$ coming in contact with one another.

Between the jaws and moving on the pivot $a$ is a circular head, $i$, bearing a projecting awl, D, adapted to be turned into an opening in the hollow handle portion. The limit of motion to this end is determined by a stop, $n$, coming in contact with stop $g$ on one of the main jaws. As the handle portions recede from the pivot $a$, they are shaped, as shown, after the manner of a contracted cylinder having an open end. Through the open end $p$ telescopes a button-hook provided with a shank having an enlarged end, so that it cannot be entirely withdrawn from the handle portion of the jaws.

It will be observed that the awl is properly curved to puncture the hole for the reception of the coiled fastening, so that it can be first introduced through both leather and lining and then back through the lining.

Having thus described my invention, what I claim as new, and desire to secure by Letters Patent, is—

The combination-tool, substantially as described, consisting of the pivoted jaws, having bifurcated griping-openings $d$ $e$, arranged at right angle to each other, the pivoted awl, provided with a stop, $n$, and the telescopic button-hook adapted to slide in and out of the hollow handle portion, for the purpose set forth.

ALEXANDER G. WILKINS.

Witnesses:
THOMAS MINNIM,
EDWARD SWEENY.